United States Patent [19]
Payne

[11] Patent Number: 5,581,900
[45] Date of Patent: Dec. 10, 1996

[54] LEVEL CLAMP

[76] Inventor: Douglas Payne, P.O. Box 130, Ashland, Mass. 01721

[21] Appl. No.: 453,647

[22] Filed: May 30, 1995

[51] Int. Cl.⁶ .............................. G01C 9/28; F16M 13/02
[52] U.S. Cl. ..................... 33/370; 33/372; 248/229.13; 248/229.16
[58] Field of Search .................... 33/370, 371, 372; 248/229.13, 229.16; 269/254 R, 254 CS

[56] References Cited

U.S. PATENT DOCUMENTS

| | | | |
|---|---|---|---|
| 1,200,410 | 10/1916 | Chemrinsky | 33/370 |
| 1,229,916 | 6/1917 | Duncan | 33/370 |
| 1,940,808 | 12/1933 | Linsert | 33/372 |
| 2,531,563 | 11/1950 | Feldheim | 33/371 |
| 2,660,804 | 12/1953 | Mundy | 33/373 |
| 2,915,273 | 12/1959 | Gavrun, Sr. | |
| 3,230,632 | 1/1966 | Redding | |
| 4,066,232 | 1/1978 | Hermeyer | 33/372 |
| 4,745,688 | 5/1988 | Jewers | 33/372 |
| 4,829,676 | 5/1989 | Waldron | 33/372 |
| 5,063,679 | 11/1991 | Schwandt | 33/370 |
| 5,074,509 | 12/1991 | Van Orden | 33/286 |

*Primary Examiner*—Christopher W. Fulton
*Attorney, Agent, or Firm*—Morse, Altman & Benson

[57] ABSTRACT

A clamp for temporarily attaching a level to a construction component. One embodiment includes an elongated metal or plastic, inverted U-shaped body with an opening in the center of the top wall that extends down the side walls through which the level bubble is seen, a pair of pivotally-mounted, spring-loaded, opposed jaws for temporarily gripping the construction component, and a microcatch patch or screws for temporarily attaching a level to the body. A second embodiment includes a pair of bent-wire clips, where each clip has a cross piece and a downwardly extending pair of legs that are curved inward so that the ends are closer together than the length of the cross piece and the level is temporarily attached to the clips by friction between the legs and the level, and a pair of opposed bent-wire, spring-loaded jaws attached to the end of the legs for temporarily gripping the construction component.

28 Claims, 4 Drawing Sheets

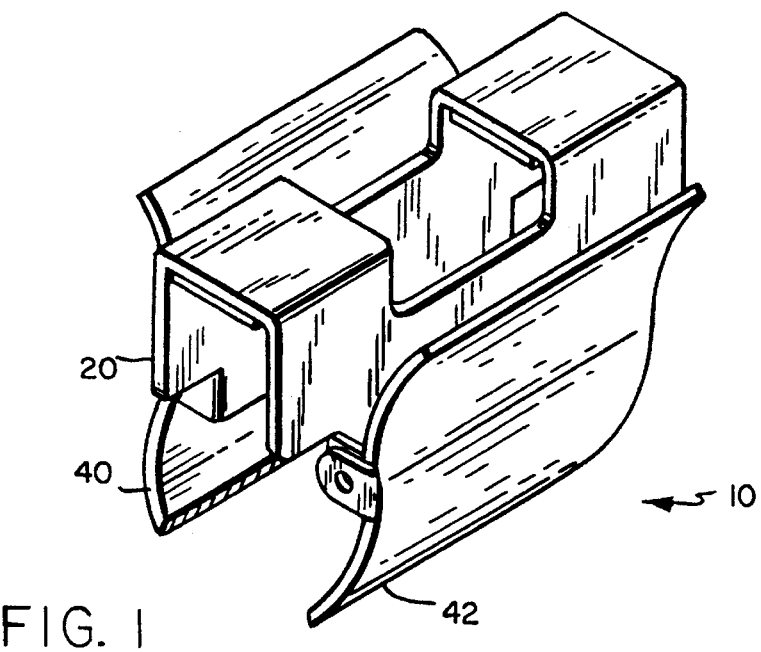
FIG. 1
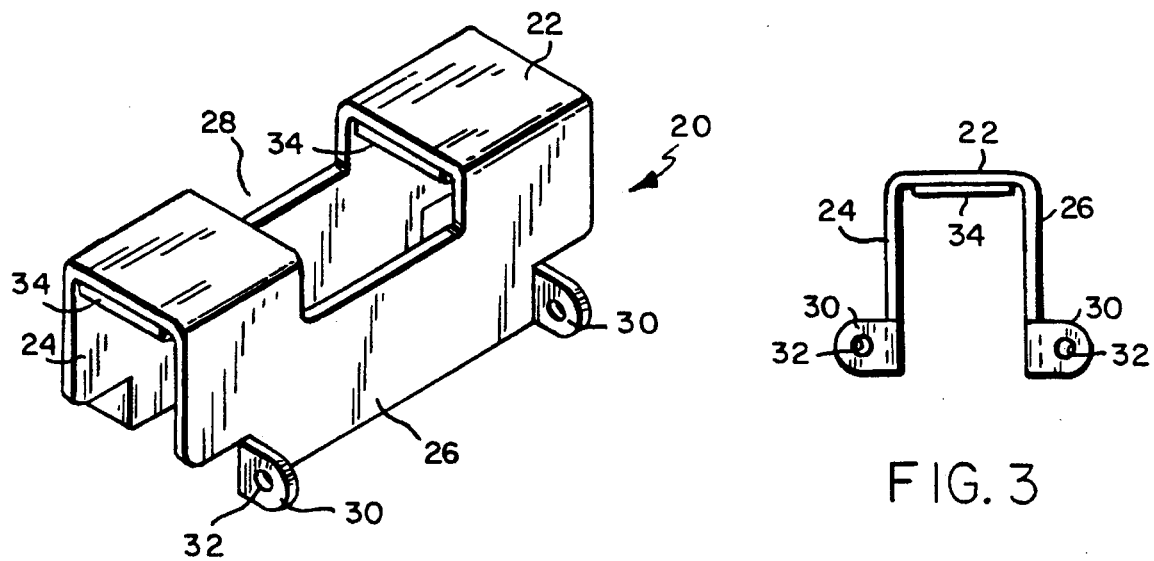
FIG. 2
FIG. 3

5,581,900

LEVEL CLAMP

BACKGROUND OF THE INVENTION

1. Field of the Invention

The present invention relates generally to tools for building construction and, more particularly, to clamps for holding levels to beams, studs, door frames, and the like.

2. The Prior Art

In any type of building construction, there are construction components that must be oriented in particular ways. For example, 2×4 wall studs must be vertical, window frames must be horizontal or vertical, ceiling joists must be horizontal, deck posts must be vertical, etc. In order to make sure that these components are oriented properly, the level, a basic tool of the construction trade, is used. The most common type of level is the bubble level. In the bubble level, a sealed vial with a slightly convex wall is nearly completely filled with a liquid. The resulting air bubble shows the orientation of the vial. When the vial is in a horizontal position, the bubble is located in the center of the vial. As the vial is moved from the horizontal position, the bubble moves from the center toward one of the ends, indicating that the vial is no longer horizontal.

In order to put the vial to practical use, it is generally mounted in a frame, two forms of which are most common, the box and the I-beam. As their names imply, the box is a three-dimensional rectangular box and the I-beam has the shape of an I in cross-section. The combination of a vial and a box frame is called a box level and the combination of a vial and an I-beam frame is called an I-beam level. The orientation of the vial in the frame depends on the use to which the level is being put. If the level is being used to test the horizontal orientation of a component, the vial is mounted parallel to the reference side of the frame. Thus, when the frame is horizontal or "level", as it is called in the construction trade, the vial is also horizontal, with the bubble centered in the vial. If the level is being used to test the vertical orientation of a component, the vial is mounted perpendicular to the reference side, so that when the reference side is vertical or "plumb", the vial is horizontal, with the bubble centered in the vial. In some special cases, a vial is mounted at an angle other than horizontal or vertical, for example, at 45° from the reference side. Most levels are made with a combination of horizontal and vertical vials.

As stated previously, the level is used to determine whether a construction component is oriented properly prior to permanently securing the component to the larger construct. To use the level, the reference side is placed flush against the component to be measured. If the appropriate bubble is located in the center of its vial, the component is properly oriented and can be secured. If the bubble is not in the center of the vial, the component must be moved until the bubble is centered and then the component can be secured.

The major drawback of the vertical or plumb level is that it takes at least one hand to hold the level flush against a vertical surface of the component while the component is being secured in place. Since it generally takes two hands to position and secure a component, a minimum of two people is needed, one person to hold the level against the component and the other to position and secure the component, which is an inefficient use of construction personnel. In addition, if the person holding the level is not diligent enough or becomes tired, one end of the level may come away from the component and show a false vertical reading, resulting in the component not being plumbed properly.

Although the horizontal level can be set on a horizontal surface of the component without being held, such conduct is not safe. If the component should slip or fall, the level could easily fall off the component, causing damage, especially to the level itself, or personal injury. Thus, the safest course is to hold the level in place while the component is being positioned and secured. As with the vertical level, since it generally takes two hands to position and secure a component, a minimum of two persons is needed, one to hold the level against the component and the other to position and secure the component, which is also an inefficient use of construction personnel.

Thus, there continues to be a need for a device that can properly and efficiently position and hold a level to a construction component, freeing both hands to safely position and secure the component and freeing one person to perform other tasks.

SUMMARY OF THE INVENTION

The level clamp of the present invention is intended to overcome the disadvantages inherent in using prior art levels during construction. Generally, this level clamp comprises: (1) a holder that has at least a cross portion and a pair of opposed side portions integrated with the cross portion; (2) a connector for joining the holder with the level during operative engagement of the level with a construction element; (3) a pair of opposed jaws pivotally attached to the opposed side portions that clamp the construction element therebetween when the level and construction element are in operative engagement; and (4) an opening in the holder for display of the level's bubble when the holder and the level are joined by the connector. Two preferred embodiments are shown in the specification.

The level clamp of one preferred embodiment includes a body, a pair of jaws for temporarily gripping a construction component, and a means for temporarily attaching a level to the body. The body is an elongated metal or rigid plastic element with an inverted U-shaped cross-section. There is an opening in the center of the top wall that extends down the side walls through which the level bubble is seen. Preferably, the level is temporarily attached inside the body by either a pair of mating microcatch patches or by screws that extend through the body and into the level.

The body has a pair of metal or plastic, pivotally mounted, opposed jaws, each jaw being mounted near the lower edge of one side wall and being substantially the same length as the body. Preferably, the lower edges of the jaws are toothed or ribbed to securely grip the component to which the level is being clamped. Preferably, the upper portions of the jaws are adapted to be manually gripped. As the upper portions of the jaws are forced together, such as by manually squeezing the edges together, the lower edges separate. As the force on the upper portions is released, a plurality of springs forces the lower edges of the jaws toward each other.

The level clamp of another preferred embodiment includes a pair of clips for holding the level and a pair of jaws for temporarily gripping a construction component. The clips are bent wire rods that have a cross segment and a downwardly extending pair of leg segments. The lower end of the leg segments are outwardly curled to form circular eyelets. The leg segments are curved in a concave manner such that the eyelets are closer together than the length of the cross element. The clips are preferably coated with a rubberized material for protecting the finish of the level.

Each jaw has a bent wire rod frame that is rectangular when viewed from the side. When viewed from the end, the upper half of the frame is approximately straight and the lower half of the frame is approximately S-shaped. There are a pair of transverse rod segments welded between the sides of the frame, one near the top and one near the bottom. The inner surfaces of the bottom and the lower transverse segment are knurled to form a non-slip surface so that the clamp will securely grip the component to which the level is being attached. Attached to the inner surface of the frame substantially parallel to the top is a shaft. The shaft is longer than the frame, extending outside of the sides. The frame and transverse segments are coated with a rubberized material for protecting the finish of the level and of the component to which the level is being attached.

The clamp is assembled by placing springs over each end of the shafts, then inserting the shafts into the eyelets of the clips such that the knurled surfaces of the jaws face each other. The hooks on the springs curl around the legs and sides of the frame to preclude the clamp from coming apart in normal operation. Alternatively, a C-clip is installed in an annular groove at the ends of the shafts, precluding the clamp from coming apart in normal operation.

BRIEF DESCRIPTION OF THE DRAWINGS

For a fuller understanding of the nature and object of the present invention, reference is made to the accompanying drawings, wherein:

FIG. 1 is a perspective view of one embodiment of the present invention;

FIG. 2 is a perspective view of the body of the clamp of FIG. 1;

FIG. 3 is an end view of the body of FIG. 2;

DETAILED DESCRIPTION

Figure 4:
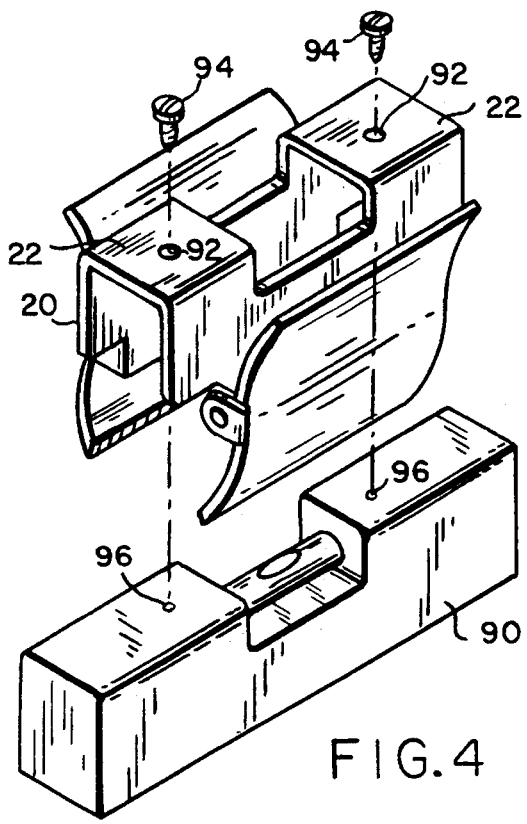
FIG. 4 is a perspective view of an alternate method for connecting the level to the clamp of FIG. 1.

The Embodiment of FIGS. 1 to 6

As shown in FIG. 1, one preferred embodiment of the level clamp 10 includes a body 20 and a pair of jaws 40, 42. The body 20 is shown in FIG. 2. Preferably, the body 20 is composed of either a formed sheet metal, such as steel, an extrusion of aluminum or rigid plastic, or a molded aluminum or rigid plastic. The preferred materials are acrylonitrile butadiene styrene resin (ABS plastic) or Lexan®. The body 20 includes a cross wall 22 and integral side walls 24, 26. The side walls 24, 26 extend downwardly substantially perpendicularly from the edges of the cross wall 22, forming an inverted U-shape when viewed in cross section, as in FIG. 3. Preferably, the body is between 4 inches and 5 inches long, between ¾ inch and 1¼ inches wide, and 1¾ inches and 2 inches high. There is an opening 28 that is the entire width of the cross wall 22 and that extends down the side walls 24, 26. The opening 28 permits the user to view the level bubble from either the top or the side.

Extending substantially perpendicularly outward from each side wall 24, 26 is a pair of flanges 30. Through each flange 30 is a substantially circular pivot hole 32. The holes 32 for each pair of flanges 30 are axially aligned.

Preferably, there are a pair of microcatch patches 34 attached to the under surface of the cross wall 22, one on either side of the opening 28. As in FIG. 7, these patches 34 mate with a pair of matching microcatch patches 82 attached to the upper surface of the level 80 and are used to removably attach the level 80 to the clamp 10. In an alternate configuration, shown in FIG. 4, the level 90 is held to the body 20 by a plurality of screws 94 that extend through a plurality of holes 92 located in the cross wall 22 and that are turned into threaded holes 96 in the top surface of the level 90.

Figure 5:
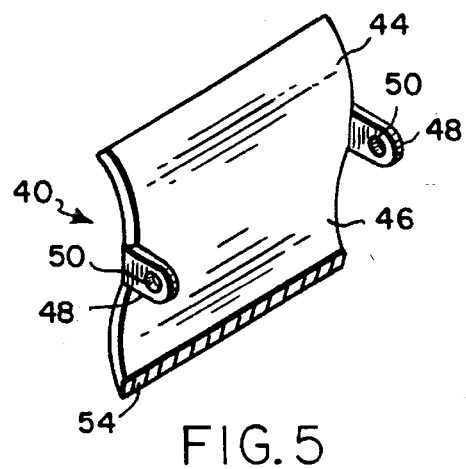
FIG. 5 is a perspective view of a jaw of the clamp of FIG. 1.

One of the pair of jaws 40 is shown in FIG. 5, and the other jaw 42 is the mirror image of the first jaw 40. Preferably, the jaws 40, 42 are approximately planar, and include an upper portion 44 and a lower portion 46. The jaws 40, 42 are approximately the same length as the body 20 and approximately twice the height of the side walls 24, 26.

Extending substantially perpendicularly from the jaw 40, 42 between the upper portion 44 and lower portion 46 are a pair of mounting flanges 48. Each flange 48 has a substantially circular pivot hole 50, where both holes 50 are axially aligned and have about the same diameter as the body pivot holes 32.

The upper portions 44 of both jaws are adapted to be easily gripped by one hand when the jaws 40, 42 are connected to the body 20, as described below. The lower portion 46 is curved inwardly in the same direction that the mounting flanges 48 extend. The inner surface adjacent to the lower edge 54 is approximately vertical and is adapted to be non-slip, for example, by serrations, teeth, or ribs. The non-slip surface 54 allows the jaws 40, 42 to securely grip the component to which it is clamping the level.

Figure 6:
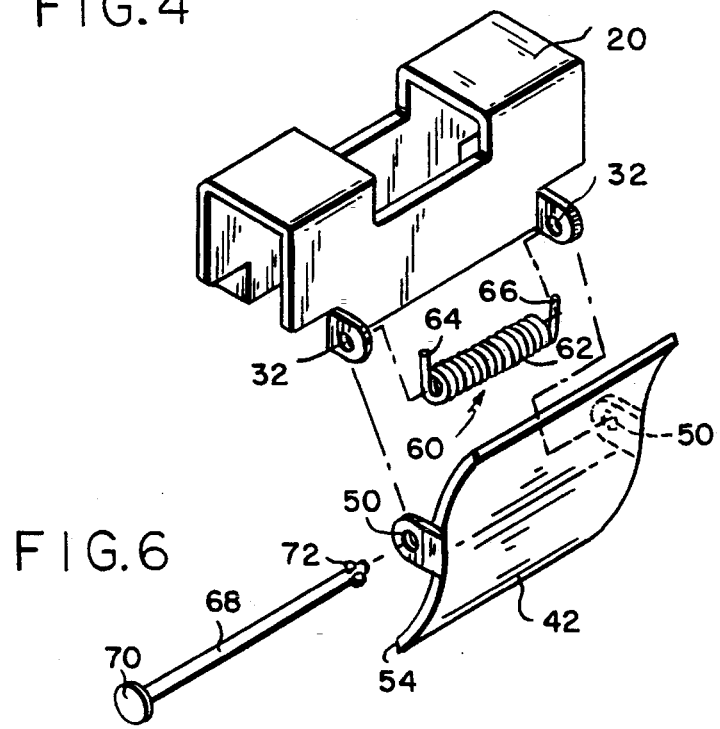
FIG. 6 is an exploded view of the assembly of one jaw to the body of the clamp of FIG. 1.

As in FIG. 6, each jaw 40, 42 is pivotally mounted to the body 20 via the body pivot holes 32 and jaw pivot holes 50 such that the non-slip surfaces 54 point toward each other and the holes 32, 50 are axially aligned. A spring 60 is associated with each jaw 40, 42. The spring 60 has a coil 62 from which the ends of the coil 64, 66 tangentially extend, forming a V-shape in cross-section, with the coil 62 at the apex. A shaft 68 extends through the holes 32, 50 and the spring coil 62. A head on one end of the shaft 70 and a flattened portion at the other end of the shaft 72 precludes the shaft 68 from being removed from the holes 32, 50 and spring coil 62. The spring 60 is oriented such that the upper portion 44 of the jaw 40, 42 is biased away from the body 20, forcing the non-slip surface 54 toward the non-slip surface of the other jaw.

Figure 7:
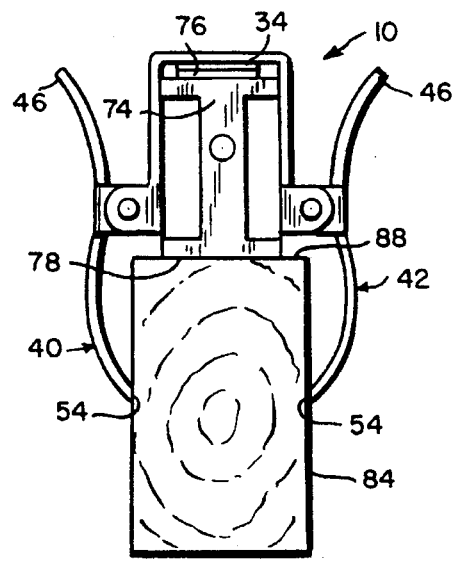
FIG. 7 is an end view of the operation of the clamp of FIG. 1 with an I-beam level.
Figure 8:
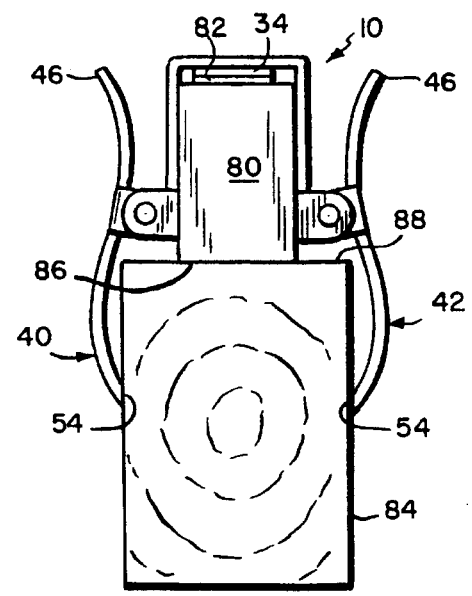
FIG. 8 is an end view of the operation of the clamp of FIG. 1 with a box level.

FIG. 7 shows that operation of the present invention with an I-beam level 74 and FIG. 8 shows the operation with a box level 80. In operation, the clamp 10 is placed over the level 74, 80 so that the microcatch patches 34, 76, 82 mate and adhere to each other. The jaws 40, 42 are opened by gripping with the hand around the top portion 46 of both jaws 40, 42 and applying pressure by closing the hand. When the non-slip surfaces 54 are far enough apart to fit around the component to which the level is being attached 84, the jaws 40, 42 are placed on either side of the component 84, making sure that the reference side of the level 78, 86 is flush to the surface of the component 88. The manual pressure is released and the non-slip surfaces 54 hold the level 74, 80 against the surface of the component 88. To remove the level 74, 80, the procedure is reversed.

The Embodiment of FIGS. 9 to 15

Figure 9:
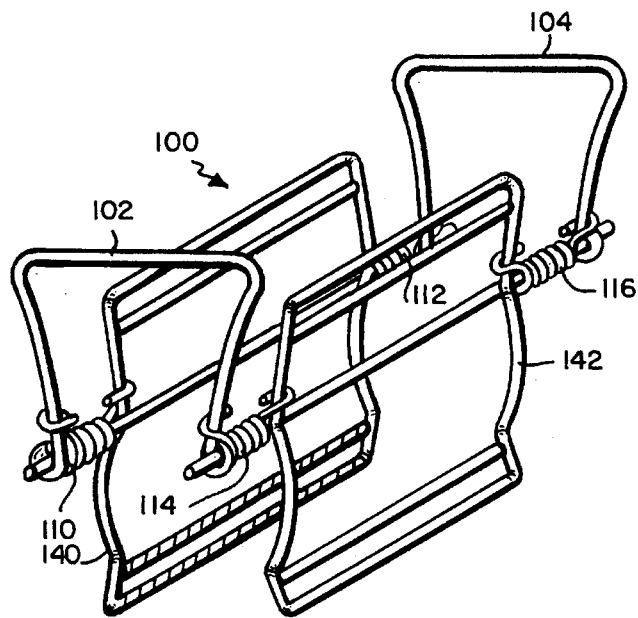
FIG. 9 is a perspective view of another embodiment of the present invention.

Another embodiment of the level clamp 100 is shown in FIG. 9. The level clamp includes a pair of clips 102, 104, a pair of jaws 140, 142, a pair of left springs 110, 112, and a pair of right springs 114, 116.

Figure 10:
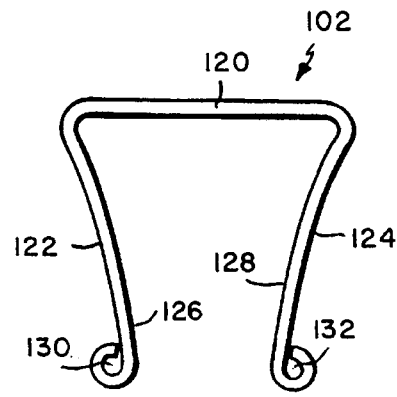
FIG. 10 is an end view of a clip for the clamp of FIG. 9.

The clips 102, 104, shown in FIG. 10, are substantially identical in shape and are composed of ⅛-inch steel rod. Each clip 102, 104 has a cross segment 120 that is approximately 1⅜ inches long. Extending downwardly from the ends of the cross segment 120 are a pair of leg segments 122, 124. The lower end of the leg segments 126, 128 are outwardly curled to form substantially circular eyelets 130, 132, with a diameter of slightly greater than 3/16 inch. The leg segments 122, 124 are curved in a concave manner such that the eyelets 130, 132 are approximately ⅞ inch apart. The length of the leg segments from the cross segment 120 to the center line of the eyelets 130, 132 is approximately 1⅝ inches. The clips 102, 104 are preferably coated with a rubberized material for protecting the finish of the level.

Figure 11:
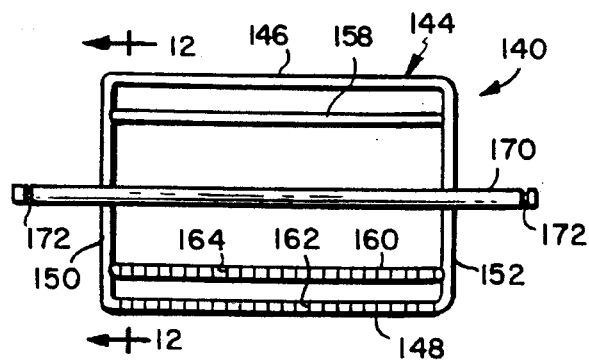
FIG. 11 is a side view of a jaw for the clamp of FIG. 9.
Figure 12:
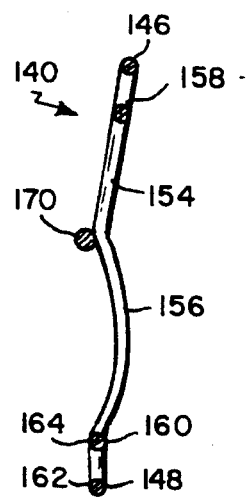
FIG. 12 is an end view of the jaw of FIG. 11 taken along the line 12—12.

The jaws 140, 142, shown in FIGS. 11 and 12, are substantially identical. The jaw 140, 142 has a frame 144 with a top segment 146, a bottom segment 148, and a pair of side segments 150, 152. When viewed from the side, as in FIG. 11, the frame 144 is substantially rectangular with a height of approximately 3¾ inches and a length of approximately 4½ inches. When viewed from the end, as in FIG. 12, the upper half of the side segments 154 are approximately straight and the lower half of the side segments 156 are approximately S-shaped.

Attached between the side segments 150, 152 are a pair of transverse segments 158, 160, one near the top segment 146 and one near the bottom segment 148. Preferably, the transverse segments 158, 160 are welded to the side segments 150, 152. The inner surfaces of the bottom segment 162 and the lower transverse segment 164 are flattened and knurled. The knurling forms a non-slip surface so that the clamp 100 will securely grip the component 192 to which the level 190 is being attached. The frame 144 and transverse segments 158, 160 are preferably composed of ⅛-inch steel rod and are coated with a rubberized material for protecting the finish of the level 190 and of the component 192 to which the level 190 is being attached.

Attached to the inner surface of the side segments 150, 152 and substantially parallel to the upper segment 146 and lower segment 148 is a shaft 170. The shaft 170 is approximately 1 inch longer than the frame 144, extending approximately ½ inch outside of the side segments 150, 152. The shaft 170 is preferably composed of 3/16-inch steel rod and is welded to the side segments 150, 152.

Figure 13:
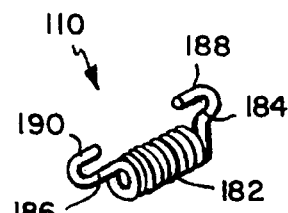
FIG. 13 is a perspective view of a left spring for the clamp of FIG. 9.

The left springs 110, 112, shown in FIG. 13, are substantially identical. Preferably, they are composed of steel spring wire. The center of each spring 110, 112 is wound into a coil 182. Extending from each end of the coil 182, perpendicular to the coil windings and parallel the coil axis, is an arm 184, 186. The ends of the arms 184, 186 are curled into opposing hooks 188, 190 in planes that are approximately tangential to the coil windings. The right springs 114, 116 are substantially identical and are mirror images of the left springs 110, 112; that is, the hooks of the right springs 114, 116 curl in the opposite direction from the hooks of the left springs 110, 112.

The clamp 100 is assembled by first placing a left spring 110, 112 over each end of the shaft 170 of one jaw 140 and a right spring 114, 116 over each end of the shaft 170 of the other jaw 142. One spring hook 188 is curled around the adjacent side segment 150, 152 above the shaft 170. One end of each shaft 170 is inserted into the eyelets 130, 132 of one of the clips 102 such that the knurled surfaces of the pair of jaws 162, 164 face each other. The other hook 190 is curled around the adjacent clip leg segment 122, 124. The other clip 104 is installed on the other end of the shafts 170 in an identical manner. The hooks 188, 190 preclude the clamp 100 from coming apart in normal operation.

Figure 14:
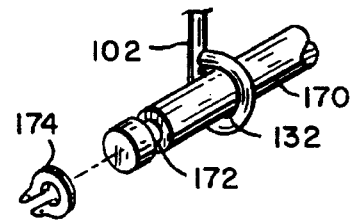
FIG. 14 is a partially exploded view in perspective of an alternate configuration for the assembly of the clamp of FIG. 9.

In an alternate configuration, shown in FIG. 14, the springs 110, 112, 114, 116 do not have the hooks 188, 190. After the clips 102, 104 are assembled onto the ends of the shafts 170, C-clips 174 are installed into annular grooves 172 near the ends of the shafts 170. The C-clips 174 preclude the clamp 100 from coming apart in normal operation. Alternatively, the annular grooves 172 and C-clips 174 are replaced by flattening the outer ends of the shafts such that they are wider than the inside diameter of the eyelets 130, 132, precluding the clamp 100 from coming apart in normal operation.

Figure 15:
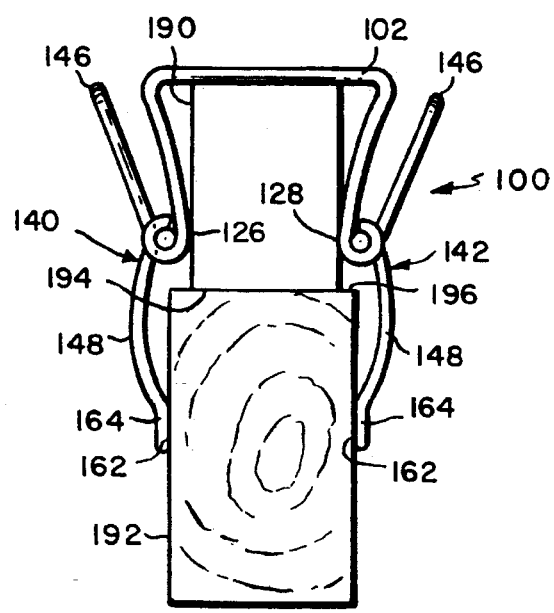
FIG. 15 is an end view of the operation of the clamp of FIG. 9.

The operation of the clamp 100 with a box level 190 is shown in FIG. 15. The clips 102, 104 are placed around the level 190. The pressure exerted by the lower portions of the clip leg segments 126, 128 hold the level 190 in the clamp 100. The jaws 140, 142 are opened by gripping with the hand around the top segment 146 and upper transverse segment 158 of both jaws 140, 142 and applying pressure by closing the hand. When the bottom segments 148 of the jaws 140, 142 are far enough apart to fit around the component to which the level is being attached 192, the jaws 140, 142 are placed on either side of the component 192, making sure that the reference side of the level 194 is flush to the surface of the component 196. The hand pressure is released and the non-slip surfaces 162, 164 of the jaws 140, 142 hold the level 190 against the surface of the component 196. To remove the level 190, the procedure is reversed.

What is claimed is:

1. A clamp for temporarily holding a level against an elongated construction element having a straight edge to be predeterminedly oriented, said level including at least a straight edge and at least a bubble geometrically related thereto, said clamp comprising:

(a) a holder having at least a cross portion and a pair of opposed side portions integrated with said cross portion;

(b) a connector for joining said holder with said level during operative engagement of said level with said construction element;

(c) a pair of opposed jaws pivotally attached to said opposed side portions, said jaws having an upper portion and a lower portion, said pivotal attachment including at least one spring for biasing the lower edge of said jaw lower portions toward each other;

(d) said jaws clamping said construction element therebetween when said level and said construction element are in said operative engagement;

(e) said holder having an opening for display of said bubble when said holder and said level are joined by said connector.

2. The clamp of claim 1 wherein said holder is integral.

3. The clamp of claim 2 wherein said side portions extend substantially perpendicularly from said cross portion.

4. The clamp of claim 2 wherein said holder opening extends across the entire width of said cross portion and extends down said side portions.

5. The clamp of claim 2 wherein said connector for joining said holder with said level includes at least one microcatch patch attached to the surface of said cross portion adjacent to said side portions and a mating microcatch patch attached to said level.

6. The clamp of claim 2 wherein said connector for joining said holder with said level includes a plurality of through holes in said cross portion, a plurality of screws, and threaded holes in said level, whereby said screws are inserted into said through holes and turned into said threaded holes.

7. The clamp of claim 2 wherein the lower edge of said jaw lower portion comprises a non-slip surface.

8. The clamp of claim 2 wherein said upper portions of said jaws are adapted to be manually gripped.

9. The clamp of claim 2 wherein said pivotal attachment includes:

(a) a pair of flanges extending outwardly substantially perpendicularly from each of said side portions;

(b) a flange hole in each of said flanges;

(c) a pair of ears extending substantially perpendicularly from each of said jaws;

(d) an ear hole in each of said ears;

(e) said pair of flange holes and said pair of ear holes being axially aligned; and (f) a shaft extending through said pair of flange holes and said pair of ear holes.

10. The clamp of claim 2 wherein said holder is composed of a material selected from the group consisting of sheet steel, extruded aluminum, extruded rigid plastic, cast aluminum, and molded rigid plastic.

11. The clamp of claim 2 wherein said jaws are composed of a material selected from the group consisting of extruded aluminum, extruded rigid plastic, cast aluminum, and molded rigid plastic.

12. The clamp of claim 1 wherein said holder includes two substantially identical parts composed of a bent steel rod:

(a) each of said parts including said cross portion and said opposing side portions, said opposing side portions extending from the ends of said cross portion;

(b) said side portions being concavely curved such that said ends of said side portions distant from said cross portion are closer together than the length of said cross portion;

(c) said holder being joined to said level by friction between the side portions and opposing walls of said level.

13. The clamp of claim 12 wherein:

(a) said ends of said side portions distant from said cross portion are curled outwardly to form eyelets;

(b) each of said jaws are approximately rectangular and having a lower edge and a pair of opposing side edges;

(c) each of said jaws has a pair of axially aligned shafts extending outwardly from said side edges;

(d) one of said shafts from each of said jaws being pivotally connected to said eyelets of one of said holder parts; and (e) the other of said shafts from each of said jaws being pivotally connected to said eyelet of the other of said holder parts.

14. The clamp of claim 13 wherein there is at least one of said springs on each of said shafts, said springs having a coil and at least one hooked arm extending from said coil, said shafts extending through said coils and said eyelets.

15. The clamp of clamp 12 wherein each of said jaws comprises a bent steel rod, each of said jaws having an approximately rectangular frame.

16. The clamp of claim 15 wherein said steel rods are substantially encapsulated by a resilient rubber coating.

17. The clamp of claim 12 wherein the lower edges of said jaws comprise opposing non-slip surfaces.

18. The clamp of claim 12 wherein the upper portions of said jaws are adapted to be manually gripped.

19. The clamp of claim 12 wherein said steel rods are substantially encapsulated by a resilient rubber coating.

20. A clamp for temporarily holding a level against an elongated construction element having a straight edge to be predeterminedly oriented, said level including at least a straight edge and at least a bubble geometrically related thereto, said clamp comprising:

(a) an integral holder having at least a cross portion and a pair of opposed side portions integrated with said cross portion, said side portions extending substantially perpendicularly from said cross portion;

(b) a connector for joining said holder with said level during operative engagement of said level with said construction element;

(c) a pair of opposed jaws pivotally attached to said opposed side portions, said jaws having an upper portion and a lower portion, said upper portions of said jaws being adapted to be manually gripped, and the lower edge of said jaw lower portion comprising a non-slip surface;

(d) said jaws clamping said construction element therebetween when said level and said construction element are in said operative engagement;

(e) said holder having an opening for display of said bubble when said holder and said level are joined by said connector, said opening extending across the entire width of said cross portion and extending down said side portions;

(f) said holder being composed of a material selected from the group consisting of sheet steel, extruded aluminum, extruded rigid plastic, cast aluminum, and molded rigid plastic; and (g) said jaws being composed of a material selected from the group consisting of extruded aluminum, extruded rigid plastic, cast aluminum, and molded rigid plastic.

21. The clamp of claim 20 wherein said connector for joining said holder with said level includes at least one microcatch patch attached to the surface of said cross portion adjacent to said side portions and a mating microcatch patch attached to said level.

22. The clamp of claim 20 wherein said connector for joining said holder with said level includes a plurality of through holes in said cross portion, a plurality of screws, and threaded holes in said level, whereby said screws are inserted into said through holes and turned into said threaded holes.

23. The clamp of claim 20 wherein each of said pivotal attachments includes a pair of flanges extending outwardly substantially perpendicularly from one of said side portions, a flange hole in each of said flanges, a pair of ears extending substantially perpendicularly from one of said jaws, an ear hole in each of said ears, at least one spring for biasing said lower edge of said jaw lower portions toward each other, and a shaft extending through said pair of flange holes and said pair of ear holes.

24. A clamp for temporarily holding a level against an elongated construction element having a straight edge to be predeterminedly oriented, said level including at least a straight edge and at least a bubble geometrically related thereto, said clamp comprising:

(a) a holder including two substantially identical parts composed of a bent steel rod, each of said parts including a cross portion and opposing side portions, said opposing side portions extending from the ends of said cross portion;

(b) the ends of said opposing side portions distant from said cross portion are curled outwardly to form eyelets;

(c) said side portions being concavely curved such that said eyelets are closer together than the length of said cross portion;

(d) a pair of opposed jaws pivotally attached to said opposed side portions, said jaws having an upper portion and a lower portion;

(e) each of said jaws being approximately rectangular and having an upper portion, a lower edge, a pair of opposing side edges, and a pair of axially aligned shafts extending outwardly from said side edges;

(f) said lower edges comprising opposing non-slip surfaces and said upper portions are adapted to be manually gripped;

(g) one of said shafts from each of said jaws being pivotally connected to said eyelets of one of said holder parts; and (h) the other of said shafts from each of said jaws being pivotally connected to said eyelet of the other of said holder parts.

(i) said holder being joined to said level by friction between the side portions and opposing walls of said level;

(j) said jaws clamping said construction element therebetween when said level and said construction element are in said operative engagement.

25. The clamp of claim 24 wherein said pivotal attachment includes at least one spring on each of said shafts for biasing said jaw lower edges toward each other, said springs having a coil and at least one hooked arm extending from said coil, said shafts extending through said coils and said eyelets, said shaft being retained in said eyelet by said arm hooking said holder part side portion.

26. The clamp of claim 24 wherein said pivotal connection includes said shafts extending through said eyelets, said shafts being retained in said eyelets by the ends of said shaft being larger in diameter than the inside diameter of said eyelets.

27. The clamp of claim 24 wherein each of said jaws comprises a bent steel rod, each of said jaws having an approximately rectangular frame, said steel rods being substantially encapsulated by a resilient rubber coating.

28. The clamp of claim 24 wherein said steel rods are substantially encapsulated by a resilient rubber coating.

* * * * *